Patented Sept. 23, 1941

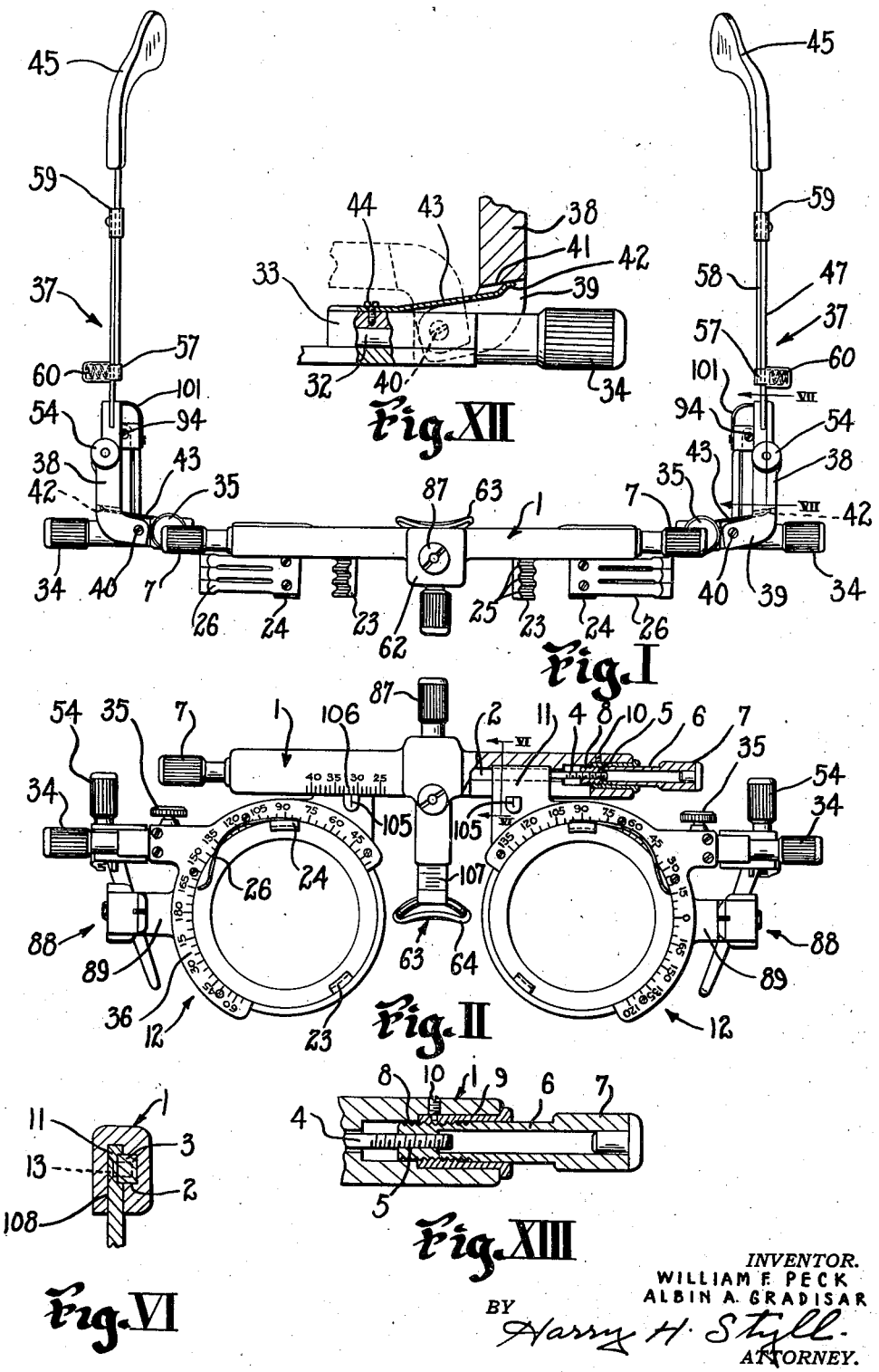

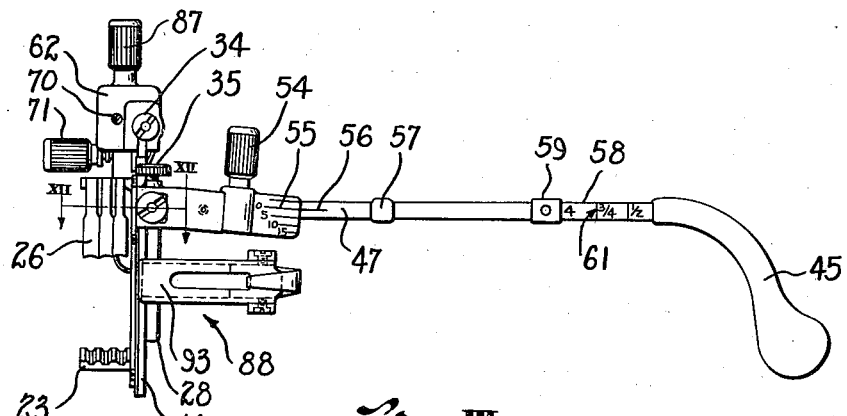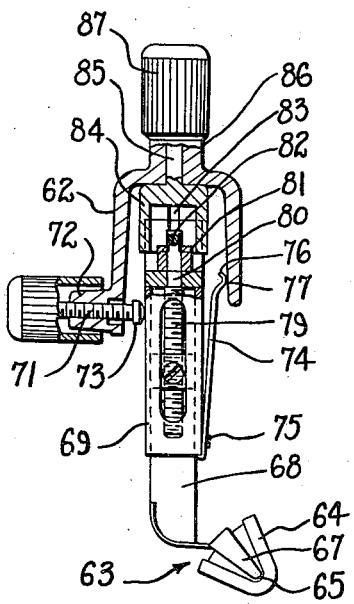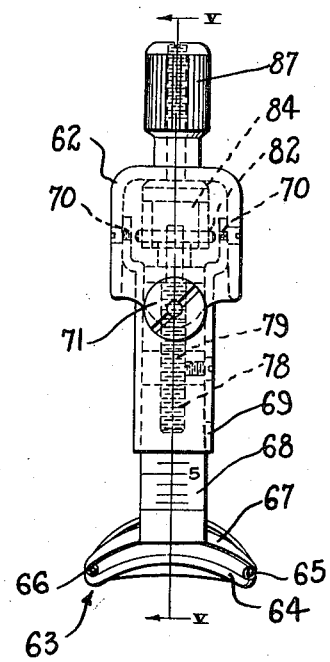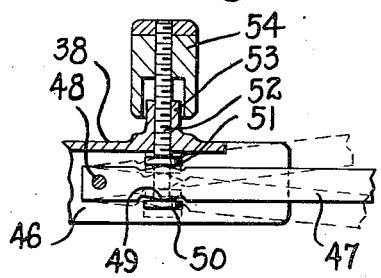

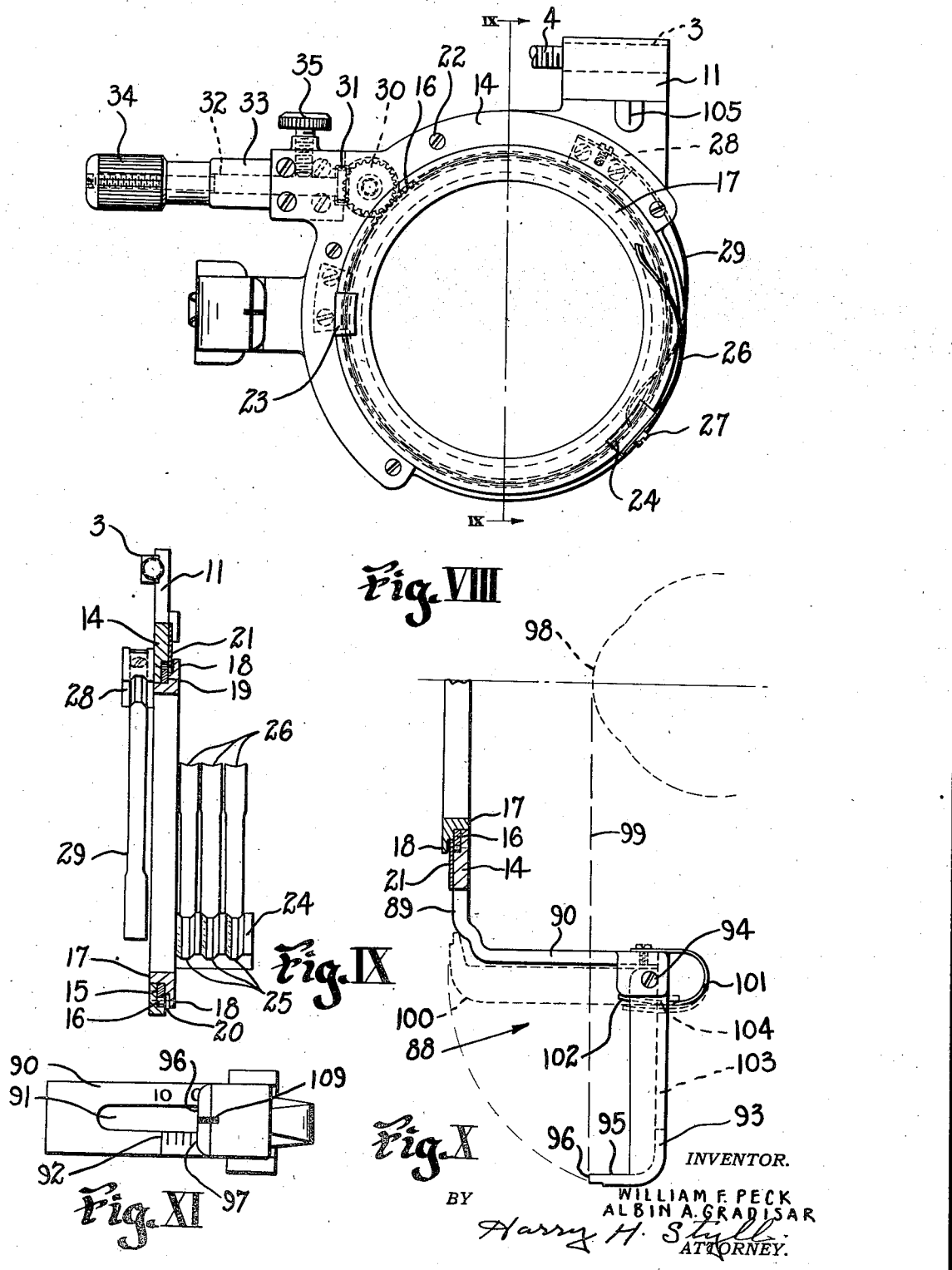

2,256,491

UNITED STATES PATENT OFFICE 2,256,491

TRIAL FRAME

William F. Peck, Kenmore, and Albin A. Gradisar, Buffalo, N. Y., assignors to American Optical Company, Southbridge, Mass., a voluntary association of Massachusetts Application October 24, 1939, Serial No. 301,006

14 Claims. (Cl. 88—20)

This invention relates to improvements in trial frames and has particular reference to a trial frame which may be quickly and easily adjusted to the facial requirements of different individuals and adapted for use in supporting trial test lenses before the eyes of an individual.

One of the prime objects of the invention is to provide a light weight trial frame of the above character with simple and efficient operable parts whereby the trial frame may be quickly and easily adjusted to the facial requirements of an individual and with the adjustable parts maintaining a rigid and positive adjusted relation with each other.

Another object of the invention is to provide improved means for supporting trial test lenses before the eyes of an individual with the lenses before each eye mathematically spaced relative to each other and to the cornea of the eyes of said individual to give exact additive effective power when test lenses of the additive type are used whereby said means may be adjusted to the facial requirements of an individual while maintaining parts in rigid adjusted relation with each other and which is rigidly and accurately built whereby the parts will not become displaced or strained during normal use and accuracy and ease of operation is achieved throughout the life of the instrument.

Another object is to provide novel corneal aligning means and cooperating novel means for adjusting a trial frame of the above character to position the lens cells in desired spaced relation with the lenses and to fit the trial frame generally to the facial characteristics of an individual to be tested.

Another object is to provide a trial frame with temple supports located above the useful field of side vision and above the pupil of the eye when in position of use on the face when the eyes are held for straight ahead vision.

Another object is to provide an arrangement whereby the lens cells of the trial frame of the character described may be quickly and easily adjusted in varying spaced relation with each other according to the interpupilar requirements of an individual.

Another object is to provide the corneal aligning device which has a three point aligning function or gunsight function in locating the lenses in desired relation with the eyes.

Other objects and advantages of the invention will become apparent from the following description taken in connection with the accompanying drawings and it will be apparent that any modification might be made in the detail of construction and arrangement of parts shown and described without departing from the spirit of the invention as expressed in the accompanying claims. I, therefore, do not wish to be limited to the exact details and arrangements shown and described as the preferred form only has been given by way of illustration.

Referring to the drawings:

Fig. I is a plan view of the device embodying the invention;

Fig. II is a front elevation of said device;

Fig. III is a side elevation of said device;

Fig. IV is an enlarged fragmentary face view of the nose rest supporting means;

Fig. V is a sectional view taken as on line V—V of Fig. IV.

Fig. VI is a fragmentary enlarged sectional view taken as on line VI—VI of Fig. II;

Fig. VII is a fragmentary enlarged sectional view taken as on line VII—VII of Fig. I;

Fig. VIII is an enlarged face view of one of the lens cells of the device embodying the invention;

Fig. IX is a sectional view taken as on line IX—IX of Fig. VIII;

Fig. X is a fragmentary plan view of the corneal aligning means diagrammatically illustrating its use;

Fig. XI is a side elevation of the corneal aligning means illustrated in Fig. X;

Fig. XII is an enlarged fragmentary partial sectional view taken as on line XII—XII of Fig. III; and Fig. XIII is an enlarged section of a portion of Fig. II.

Trial frames for supporting trial test lenses before the eyes of an individual have heretofore been constructed with various adjustable parts whereby the frame could be fitted to the facial characteristics of an individual whose eyes were to be tested. The difficulty, however, with most of these prior art trial frames was that the parts could not be adjusted in a simple and efficient manner and would not retain their adjusted relation during use. The parts would soon become worn and wobbly and would not retain the lenses in proper relation with the eyes. Most prior art trial frames, even when provided with corneal aligning means did not insure that the said lenses were properly positioned in spaced relation with the eyes. This was due to the fact that most of such corneal aligning means had a single point alignment with the cornea of the eye.

Most prior art trial frames also had their temple supporting means located at the geometrical centers of the lens supporting means along the horizontal meridian of said means so that the examiner or practitioner could not obtain a clear view of the eyes during the fitting of the trial frame to the face and when positioning the lens cells in desired spacial relation with the eyes.

It is therefore one of the primary objects of this invention for a trial frame to have its temple supporting means located above the useful field of vision whereby the examiner or practitioner can obtain a clear view of the eyes during the aligning of the lens cells therewith, which will give the accurate angle of temple relative to the point of the lenses of the mounting which is to be primarily used for the accurate locating of the lens cells and lenses and equal spaced relation with the eyes through the provision of a three point sighting when aligning the corneal aligning means with the cornea of the eye, which is light in weight, has simple and efficiently operable parts whereby the frame may be quickly and easily adjusted to the facial requirements of an individual and with the adjustable parts maintaining a rigid and positive adjusted relation with each other, and the method of making the same.

Referring more particularly to the drawings wherein like characters of reference designate like parts throughout the several views, the device embodying the invention comprises a head 1 having longitudinal slideways 2 therein. In each slideway 2 there is mounted a slide block 3, see Fig. VI. Each of the slide blocks 3 have a threaded stem 4 extending therefrom in the direction of the longitudinal axes of the slideways 2. The stem 4, as illustrated in Figs. II and XIII, is received within the threaded bore 5 of a hollow member 6 having a finger grip end 7 thereon. A member 6 is provided with an externally threaded end portion 8 threadedly supported within the threaded bore of a sleeve 9 secured to the head 1 by a set screw or the like 10 in axial alignment with the slideway 2. The threads of the stem 4 are opposite to those of the external threaded end 8 of the member 6. For example, the thread of the stem 4 in one instance is a left hand thread, preferably a double thread, and the threads of the external threaded end 8 are right hand threads. The threads for the respective portion on the other end of the head are in reverse order. It is to be noted that when the finger grip end 7 is rotated the threaded end 8 of the member 6 will cause said member to move longitudinally of the sleeve 9 either in or out depending upon the direction of rotation of the member 6. Simultaneous to the movement of the member 6, longitudinally of the sleeve 9 through its thread connection 8 with the said sleeve, the threaded stem 4 will be drawn inwardly or outwardly of the hollow member 6. The arrangement is such that when the member 6 is threaded in a direction inwardly of the sleeve 9 the stem 4 will be threaded in a direction outwardly of the bore of the sleeve 9. This causes the speed of movement of the slide block 3 longitudinally of the slideway 2 to be greatly increased over the similar movement which might be introduced by a single thread connection. The head 1 has two slideways 2 therein and the slideblocks and associated mechanism similar to that set forth above are associated with each of said slideways. To each of these slideblocks 3 there is attached, by suitable projections 11, lens cell supporting members 12. The projections 11 are secured to the slide blocks 3 by soldering, welding or by rivets or the like 13, as illustrated by dotted lines in Fig. VI. When the slideblocks 3 therefore are moved longitudinally of the slideways 2, the lens cells 12 connected with said slideblocks through the projections 11, will be simultaneously moved toward or away from each other. The lens cells 12, as shown in enlarged scale in Figs. VIII and IX, each comprise annular like members 14 formed integral with the projections and annular portions thereof lying in a single plane. The annular like members 14 each have a recessed side surface 15 in which is fitted annular gear members 16. The depth of each recess 15 is such that the outer surface of said annular gear members will lie substantially flush with the adjacent side surface of the annular like members 14. The annular gear members 16 are each frictionally secured to a ring 17 rotatably fitted within the central opening of the annular-like members 14. The rings 17 each have an integral flanged portion 18 having an intermediate step like shouldered portion 19 against which the annular gear 16 rests when in frictional engagement with the ring 17. The shouldered steplike portion 19 forms a space 20 between the gear 16 and the flanged portion 18 of the ring 7. Within this space there is mounted a plate 21 of an arcuate shape. The plate 21 is secured to the annular like member 14 by screws or the like 22. The plate 21 functions to rotatably support the gear 16 in the annular like member 14. The gear 16 being frictionally secured to the ring 17 thereby retains the ring in associated relation with the annular member 14. The flanged portion 18 functions to conceal the gear within the recess 16. The rings 17 which are secured to the gears 16 are adapted to rotate with said gears internally of the annular like members 14 and are each provided with spaced studs 23 and 24. The studs 23 and 24 are each provided with a plurality of spaced notches 25 in which auxiliary trial lenses are adapted to be supported. The said trial lenses are held in the notches of said stud by a plurality of spring fingers 26 secured to the studs 24 by screws or the like 27. The auxiliary trial lenses are adapted to be snapped into and out of fitted relation with the notches 25 and the said notches 25 are so spaced as to retain the said lenses in desired spaced relation with each other. This spaced relation will be described more in detail hereinafter. The annular like members 14 are each provided on the side thereof opposite the forwardly projecting studs 24 and 25 with an auxiliary trial lens holder 28 having spring fingers 29 for retaining the trial lens in axial alignment with the ring 17. The auxiliary lens holder 28 is adapted to support spherical lenses while the spring fingers 26 and associated notched studs 23 and 24 are adapted to support cylindrical and prismatic lenses. The auxiliary lens holding studs 23 and 24 are adapted to be rotated through rotation of the rings 17. This is brought about through the provision of an intermediate gear 30 which meshes with a gear 31 mounted on the end of a stem 32 rotatably supported within a bearing 33 carried by the annular like member 14. The stem 32 is provided with a thumb piece 34 whereby the gear 31 may be rotated with the said rotated movement being transferred through the gear 30 to the annular gear 16. Rotation of the thumb piece 34 therefore causes the ring 17 to rotate through the train of gears 16, 30 and 31. A suitable screw or the like 35 threadedly supported on the bearing 33 is adapted to be adjusted into and out of binding relation with the stem 32 so as to lock the gear 31 against rotation when the ring 17 has been rotated to desired position. The purpose of rotating the ring 17 is to move the axis or axes of the auxiliary cylindrical or prismatic lenses supported by the studs 23 and 24 and associated spring fingers 26 to desired meridinal position. The proper meridinal position is determined through the provision of a suitable protractor or degree scale 36 formed on the outer surface of the arcuate plate sections 21, see Fig. II. The longitudinal axis of the bearings 33 and the stems 32 rotatably supported thereby are located above the horizontal center line of the annular like members 14 and project outwardly of said annular like members 14 along a line substantially parallel with said horizontal line passing through said annular like members and along a line radial with said annular like members. The bearing portions 33 provide a hinge connection for the temples 37 and support said temples normally above the useful field of side vision when the device is in position of use on the face of an individual under test. The temples 37 are each provided with a portion 38 having a bifurcated end 39 pivotally attached to the bearing portion 33 as illustrated at 40 with the branches of the bifurcation 39 straddling said bearing portion 33, see Figs. I and XII. The portion 38 of each temple is provided with a bearing face 41. The base of the bifurcation 39 is adapted to be engaged by the end 42 of a blade spring 43 secured to the bearing portion 33 by screws or the like 44. The end 42 of the blade spring 43 is adapted to bear against the bearing face 41 when the temples are in extended relation or in position of use. The said springs are adapted to limit the outward pivotal movement of the temples about their pivot connections 40 so that when the temples are moved outwardly beyond a given point the blade springs 43 will be compressed and will tend to resiliently urge the temples inwardly. This function is adapted to cause the temple ends 45 to resiliently grip the sides of the head of the individual. When the temples are folded the blade springs 43 are adapted to extend through the bifurcated ends of the temple. The relatively rigid portions 38 are provided with a slotted recess 46, see Fig. VII, in which a bar-like intermediate section 47 is pivotally supported as illustrated at 48. Adjacent the pivotal connection 48 of the bar-like section 47 the said bar is provided with opposed edge portions having a point contact 49 with spaced flanges 50 and 51 carried by a screw member 52. The screw 52 is supported within the threaded bore of a boss 53 on the relatively rigid portion 38. The screw 52 is provided with a thumb piece 54 by which it may be rotated. Rotation of the screw in one or the other directions causes the flanged portions 50 and 51 to raise or lower the intermediate bar-like portion of the temple about its pivotal connection 48 with said portion 38. The bar like member 47 is of a thickness so as to substantially intimately fit transversely within the slotted recess 46 and has a relatively intimate sliding fit with the side walls of said slotted recess so that there is little if any side play about the pivotal connection 48. The angle of adjustment of the intermediate section 47 is determined through the provision of a suitable scale 55 on the portion 48 and indicator 56 on said portion 47, see Fig. III. This determines the angular disposition of the plane of the lens cells relative to the longitudinal axis of the temples. The section 47, as illustrated in Figs. I and III, extends through a bearing 57 carried by the end of a bar 58 simulating the bar 47. The bar 47 likewise is provided with a bearing member 59 through which the bar 58 slidably extends. The bars 47 and 58 are substantially rectangular in cross-sectional shape and have relatively flat contiguous surfaces adapted to be retained in relatively intimate sliding relation with each other. A suitable coil spring or the like 60 is mounted within the bearing 57 so as to maintain a frictional binding relation between the adjacent portions of the bars 47 and 58. The springs are adapted to retain the sections 47 and 58 in longitudinally adjusted relation with each other. The purpose of this adjustment is to increase or decrease the length of temple so as to meet the requirements of different individuals. The length of temple is determined through the provision of a suitable scale 61 on the side surface of the bar 58. The bearings 57 in which the friction coil springs 60 are housed provide means adapted to be engaged by the finger of the practitioner or examiner who fits the device to the individual to be tested so that the ends 45 of the temples may be quickly and easily adjusted to relatively intimate fit behind the ears of the individual and with the side of the head of said individual. This is brought about by merely moving the housing 57 longitudinally of the bar-like section 47 toward the front of the device. It being understood that the temples are initially adjusted to substantially their greatest length so that when the device is placed on the face the ends 45 of the temples may be eased into position by exerting a forward pressure on the bearing members 57. The central portion of the head 1 is provided with a housing 62 carrying adjustable supporting mechanism for a nose rest 63. The nose rest 63 comprises a bearing portion 64 pivoted at 65 and 66 adjacent the opposed ends thereof to a bracket 67. The bracket 67 is mounted adjacent the lower end of a slide bar 68, see Figs. II, IV and V. The bar 68 is preferably rectangular or square in cross-section and is slidably supported within a tubular bearing 69 having a bore of a shape to slidably receive the bar 68. The tubular bearing 69 is pivoted to the side walls of the housing 62 internally thereof, as illustrated at 70, and is adapted to swing about said pivots forwardly and rearwardly about the plane of the lens supporting cells 12. The tubular bearing 69 is adjusted about its pivotal connection 70 within the housing 62 by a thumb screw 71 threadedly supported by a boss 72 on said housing. The screw has an end 73 bearing against the front surface of the tube and adjustment thereof towards the tubular bearing is adapted to move the bearing rearwardly about the pivotal connection 70. A suitable blade spring or the like 74 secured adjacent one end thereof to the tubular member by a screw or the like 75 and having an end 76 bearing against the inner side wall 77 of the housing 62 is adapted to resiliently limit the pivotal movement of the tubular bearing about the pivotal connections 70. The spring 74 constantly urges the tubular bearing 69 into engagement with the end 73 of the thumb screw 71. Through rotation of the adjustment screw 71 the nose bearing portion 64 may be moved forwardly or rearwardly as desired. The bar 68 is provided with a hollow threaded bore 78. There is threaded in this bore 78 a screw 79 rotatably supported by the upper end of the tubular bearing 69, as illustrated at 80. The screw member has an enlarged head portion 81 provided with a transversely extending stud 82 which fits within diametrically opposed slots 83 formed in a cup-like member 84. The cup-like member 84 is rotatably supported on a stem 85 mounted in a bearing 86 formed on the housing 62. The stem 85 has a thumb piece 87 by which it may be rotated. The longitudinal axis of the stud 82 is preferably substantially coaxial with the axes of the pivot 70 so that when the tubular bearing 69 is tilted forwardly or rearwardly through manipulation of the screw 71 the tilting will effectively be about the longitudinal axis of the stud 82. The stud 82, fitting within the diametrically opposed slots 83 in the cup-like member 84, is adapted to permit rotation of the screw 79 at different positions of tilting of the tubular bearing 69 and the arrangement provides a universal type coupling between the screws 79 and the thumb piece 87. When the thumb piece is rotated the cup-like member 84 is simultaneously rotated. The key-like connection between the stud 82 and the longitudinal slots 83 in the cup-like member transmits said rotary movement to the screw causing it to be threaded into and out of the threaded bore 78 of the bar 68. This rotation therefore of the screw 79 will move the bar 68 inwardly and outwardly of the tubular member 69 depending upon the direction of rotation of the thumb piece 87. This adjustment permits the nose bearing portion 64 to be raised or lowered as desired with respect to the lens supporting cells of the device. The purpose of adjustably supporting the nose bearing portion for upward and downward movement is to provide means whereby the lens cells may be raised or lowered with respect to the line of straight ahead vision with the eyes of the individual under test. The purpose of adjustably supporting the nose bearing portion 64 for movement inwardly or outwardly is to move the lens cells and the trial lenses carried thereby into desired spaced relation with the eyes of the individual. This is important in a trial frame of the character described as the trial lenses which are adapted for use with said trial frame have their power or powers computed for a given distance of ocular surface from the eyes under test and the accurate effective power can only be obtained when the lenses are at their computed distance from the eyes under test. Adjustment of the nose bearing portion inwardly or outwardly permits accurate location of the ocular surface or surfaces of the trial lenses relative to the corneas of the eyes of the individual under test. To permit locating the lenses in accurate spaced relation with the eyes suitable corneal aligning means 88 are provided on the outer sides of the lens cells 12.

The corneal aligning means comprises supports 89 which are formed integrally with the annular like member 14, see Figure X. The supports 89 extend outwardly of the sides of the annular members 14 substantially along the horizontal center line of said annular members and then extend rearwardly, as illustrated at 90. The rearwardly extending portions 90 are provided with a central longitudinal slot 91 having a graduated scale 92 thereon adjacent the lower longitudinal edge of the slotted portion 91. The rearwardly extending portion 90 has a member 93 pivoted thereto, as illustrated at 94. The member 93 has a deflected end 95 provided with an edge 96 which is adapted to cooperate with a zero line 97 of the scale 92 in positioning the device in desired relation with the cornea 98 of the eye. In using the corneal aligning means 88 the practitioner moves the scale 92 from side to side thereby aligning said edge with the zero line 97 and the front surface of the cornea of the eye, as diagrammatically illustrated by the dash line 99 in Fig. X. This provides a gun sight type of corneal aligning means whereby the lens cells and lenses carried by said cells may be positioned in desired spaced relation with the front surface of the cornea of the eye. When not in use, the member 93 is adapted to be swung to a position indicated by the dash lines 100 in compact relation with the rearwardly extending portion 90 of the support 89. The member 93 is held in its inwardly or outwardly adjusted position by means of a blade spring 101 having an end 102 which is adapted to engage the outer side surface of the member 93 when in adjacent relation with the support 90 and constantly urge said member 93 towards said support so as to retain it in intimate relation therewith. The blade spring 101, when the member 93 is folded outwardly, as shown in full lines in Fig. X, is adapted to extend through a longitudinal slot 103 in said member and is adapted to bear against an edge surface 104 of said slotted portion to retain the member 93 in said outwardly adjusted position. The longitudinal slot 103 also enables the cornea of the eye to be viewed when the member 93 is in intimate relation with the rearwardly extending portion 90 of the support. The member 93 may or may not be provided with a scale similar to the scale 92 on the outer surface thereof adjacent the longitudinal edge of the slotted portion 103. When using test lenses of the type computed to measure the errors of refraction of the eyes in the so-called vertex of refraction or effective power; namely, power calculated from the eye or ocular side of the lens wherein it is essential that the lenses be positioned at the calculated distance from the cornea of the eye, the longitudinal edge 96 of the member 93 is preferably aligned with the zero line 97 of the scale 92 and the front surface 98 of the cornea of the eye. This provides 3 points of alignment so that an accurate alignment may be obtained. It is to be understood that the lenses must be supported in computed spaced relation with each other so as to have a resultant effective power simulating the actual power of the prescriptive lenses which are to be permanently used before the eyes. In order to accurately locate the lenses in desired spaced relation with each other the distance between the notches 25 of the studs 23 and 24, which are adapted to support said lenses during use, is calculated to be that of the computed distance at which the lenses were designed to be spaced relative to each other and which when held in said spaced relation will introduce the desired refractive power. The lenses, therefore, of said cells are calculated in effective or vertex refraction as it is sometimes called so that the combined values of said lenses, when in position before the eyes and when at the computed distance from the corneas of the eyes will produce the actual prescriptive value desired, that is, the resultant power of the combination of trial lenses will be that introduced by a single prescriptive lens made to said total power and supported at said computed distance from the eyes. In most instances, with average facial characteristics the trial frame may be positioned in desired location on the face. In some restricted instances, however, due to abnormalties in facial contour it will not be possible to locate the lens supporting cells in desired spaced relation with the corneas of the eyes. In these instances, therefore, some means must be provided for definitely knowing the amount of off position from the lens cells from the desired zero position before the eyes as the prescriptive correction arrived at from the test must be modified by the amount of off position of the lens cells from the corneas of the eyes in order to obtain the accurate resultant prescriptive power. In order to make this possible, a scale 92 is provided. This scale will indicate the extent of off position from the zero setting.

Although the trial frame is designed particularly for use with test lenses of the type set forth above, it is to be understood that they may be used with any desired type of test lenses and the graduated scale 92 and the known spaced relation of the corrected lenses will be quickly effective with all test lenses in arriving at the accurate prescriptive value. When used with lenses of the vertex refraction type no additional computations are necessary from the findings of the test, that is, if the corneal aligning means 88 has its zero setting aligned with the cornea of the eye the lenses are so designed and the trial frame is so designed as to support said lenses in computed spaced relation with each other and the computed distance from the cornea of the eye is such that the power arrived at either through the use of one or a plurality of test lenses will be the accurate prescriptive power required to be introduced in a single prescriptive lens to be permanently worn before the eyes of the patient and at the prescriptive standard distance from the eye.

In adjusting the trial frame to fit the individual under test and for use with test lenses of the type having vertex refraction or the lenses commercially known as additive lenses the temples 37 are first lengthened out. The practitioner or examiner who is to fit the trial frame to the individual or patient under test rests the trial frame adjacent the temple hinge connections with a finger engaging the respective housings containing the friction springs 60. The temples are spread outwardly and the trial frame is then advanced towards the eyes with the temples fitting over the ears of the individual. The nose rest 63 is engaged with the nose of the wearer and is adjusted upwardly, downwardly or inwardly or outwardly until the longitudinal edge 96 and the zero line 97 of the scale 92 are aligned with the respective corneas 98 of the eyes. It is to be understood that prior to placing the trial frame on the face of the individual the lens cells 12 are adjusted to proper spaced relation with each other, that is, to the accurate distance between the pupils of the eyes. This is accomplished by adjusting the indicators 105 to the proper fitting on the interpupillary scales 106 formed on the face of the head 1. When in this adjusted position the housings containing the friction springs 60 are again engaged by the fingers of the practitioner or examiner and are gradually drawn forward to move the temple ends 45 into proper engagement with the sides of the head and the upper rear portions of the ears of the individual. This will retain the trial frame in desired fitted position before the eyes. A final check is made of the corneal alignment and slight readjustments are made if necessary. The trial lenses are snapped inwardly or outwardly of the lens cells supports 12 during the test and when cylindrical lenses are used the lens cells are rotated in order to obtain the proper axis of the cylinders or prisms as the case may be. The scale 36 on the front of the lens cells will indicate the true axial position of the cylinders or prisms. All of the required adjustments may be made by manipulation of the various thumb pieces 71, 34, 54 and 87 without the hands of the operator engaging the face of the individual under test. The proper angle of the lens cells with respect to the line of straight ahead vision may be obtained by adjustment of the thumb piece 54 and this angle may be obtained by the scale and indicator means 55 and 56 at the sides of the temple. The length of the temple required by the individual may be obtained by the scale 61. The various adjustable parts of the device are all intimately fitted with each other so as to retain the said parts in relatively rigid relation with each other. The construction of the various parts is of the simplest form so that the device may be quickly and easily assembled and inexpensively manufactured. It is particularly pointed out that all adjustments may be positively controlled. A suitable scale 107 is provided on the front of the bridge to indicate the adjusted position of the nose pad 64. The head 1, as illustrated in Fig. VI, is provided with a longitudinal guideway 108 which functions in cooperation with the slideway 2 to retain the lens cells in rigid adjusted position. The guideways 108 eliminate forward or rearward play of the lens cells relative to the head 1. The corneal aligning means are each provided with a sighting point 109 to aid in obtaining acurate alignment of the lens cells with the corneas of the eyes. These sighting points aid in obtaining the accurate position of the centers of the lens cells with the eyes or with the line of straight ahead vision of said eyes. The particular arrangement of adjustable support for the nose pad is such that the control button or finger piece adjustment remains in a fixed position during the adjustment of the nose rest 64. The moving parts are all encased, particularly the various screw members and gears so that there is no danger of having them become entangled with the hair of the individual and are therefore protected against the entrance of dust, dirt and so forth which might hinder the smooth operation of said parts.

It is to be understood that the support for the corneal aligning means may be positioned at any desired point with reference to the periphery of the lens holders; that both corneal aligning supports need not be in the same horizontal plane, and that their position may be chosen irrespective of the position of the temple supports.

From the foregoing description it will be seen that simple, efficient and economical means are provided for accomplishing all of the objects and advantages of the invention.

Having described our invention, we claim:

1. In a device of the character described, a nose piece assembly comprising a housing, a tubular bearing pivoted internally of said housing, a slide bar in said tubular bearing having a portion with a threaded opening therein and a nose bearing member supported adjacent one end thereof, a screw member rotatably mounted internally of the tubular bearing and threadedly connected with the portion of the slide bar having the threaded opening therein and a coupling member in said housing interconnected with the screw member adapted to be rotated to rotate said screw member to move the slide bar longitudinally of said tubular bearing and permitting said tubular bearing to be swung about its pivotal connection internally of the housing.

2. In a device of the character described a nose piece assembly comprising a housing, a tubular bearing pivoted internally of said housing, a slide bar in said tubular bearing having a portion with a threaded opening therein, a nose bearing member supported adjacent one end thereof, a screw member rotatably mounted internally of the tubular bearing and threadedly connected with the portion of the slide bar having the threaded opening therein, a coupling member rotatably supported internally of said housing, said coupling member and screw member being universally connected and means for rotating said coupling member in said housing to impart rotation to said screw member to move the slide bar longitudinally of said tubular bearing with said universal connection permitting said tubular bearing to be swung about its pivotal connection internally of the housing.

3. In a device of the character described, a nose piece assembly comprising a housing, a tubular bearing pivoted to said housing, a slide bar in said tubular bearing having a portion with a threaded opening therein and a nose bearing member supported adjacent one end thereof, a screw member rotatably mounted adjacent the upper end of the tubular bearing and threadedly connected with the portion of the slide bar having the threaded opening therein, a coupling member rotatably mounted in said housing having a slot and pin assembly with the screw member, and means by which said coupling may be rotated to rotate said screw member to move the slide bar longitudinally of said tubular bearing with said slot and pin assembly permitting said tubular bearing to be swung about its pivotal connection to the housing.

4. In a device of the character described, a nose piece assembly comprising a housing, a tubular bearing pivoted to said housing, a slide bar in said tubular bearing having a portion with a threaded opening therein and a nose bearing member supported adjacent one end thereof, a screw member rotatably mounted adjacent the upper end of the tubular bearing and threadedly connected with the portion of the slide bar having the threaded opening therein, a coupling member rotatably mounted in said housing and loosely interconnected with the screw member adapted to be rotated to rotate said screw member to move the slide bar longitudinally of said tubular bearing with the loose connection permitting said tubular bearing to be swung about its pivotal connection to the housing and means for adjusting said tubular bearing to selected adjusted positions about its pivotal connection.

5. In a device of the character described a housing having guideways extending outwardly of the opposed sides thereof, a tubular bearing pivoted internally of said housing, a slide bar in said tubular bearing having a portion with a threaded opening therein and a nose bearing member supported adjacent one end thereof, a screw member rotatably mounted internally of said tubular bearing and threadedly connected with the portion of the slide bar having the threaded opening therein, a coupling member in said housing adjustably interconnected with the screw member adapted to be rotated to rotate said screw member to move the slide bar longitudinally of said tubular bearing with said adjustable interconnection permitting said tubular bearing to be swung about its pivotal connection internally of the housing, and lens cell supporting means slidably mounted in said respective guide means.

6. In a device of the character described a housing having guideways extending outwardly of the opposed sides thereof, a tubular bearing pivoted internally of said housing, a slide bar in said tubular bearing having a portion with a threaded opening therein and a nose bearing member supported adjacent one end thereof, a screw member rotatably mounted internally of said tubular bearing and threadedly connected with the portion of the slide bar having the threaded opening therein, a coupling member in said housing adjustably interconnected with the screw member adapted to be rotated to rotate said screw member to move the slide bar longitudinally of said tubular bearing with said adjustable interconnection permitting said tubular bearing to be swung about its pivotal connection internally of the housing and lens cell supporting means slidably mounted in said respective guide means, said lens cell supporting means having temples pivotally supported thereby.

7. In a device of the character described a housing having guideways extending outwardly of the opposed sides thereof, a tubular bearing pivoted internally of said housing, a slide bar in said tubular bearing having a portion with a threaded opening therein and a nose bearing member supported adjacent one end thereof, a screw member rotatably mounted internally of said tubular bearing and threadedly connected with the portion of the slide bar having the threaded opening therein, a coupling member in said housing adjustably interconnected with the screw member adapted to be rotated to rotate said screw member to move the slide bar longitudinally of said tubular bearing with said adjustable interconnection permitting said tubular bearing to be swung about its pivotal connection internally of the housing, and lens cell supporting means slidably mounted in said respective guide means, said lens cell supporting means having temples pivotally supported thereby and having rearwardly extending corneal aligning means thereon.

8. In a device of the character described a housing having guideways extending outwardly of the opposed sides thereof, a tubular bearing pivoted internally of said housing, a slide bar in said tubular bearing having a portion with a threaded opening therein and a nose bearing member supported adjacent one end thereof, a screw member rotatably mounted internally of said tubular bearing and threadedly connected with the portion of the slide bar having the threaded opening therein, a coupling member in said housing adjustably interconnected with the screw member adapted to be rotated to rotate said screw member to move the slide bar longitudinally of said tubular bearing with said adjustable interconnection permitting said tubular bearing to be swung about its pivotal connection internally of the housing, lens cell supporting means slidably mounted in said respective guide means, said lens cell supporting means having temples pivotally supported thereby and having rearwardly extending corneal aligning means thereon, said corneal aligning means comprising a supporting member, a sighting member pivoted to said supporting member, and resilient means adapted to hold said supporting member in adjusted position relative to said sighting member, said supporting member and said sighting member each having aligning means thereon which is alignable with the guide mark on the other and one of said members having scale means thereon.

9. In a device of the character described a housing having guideways extending outwardly of the opposed sides thereof, a tubular bearing pivoted internally of said housing, a slide bar in said tubular bearing having a portion with a threaded opening therein and a nose bearing member supported adjacent one end thereof, a screw member rotatably mounted internally of said tubular bearing and threadedly connected with the portion of the slide bar having the threaded opening therein, a coupling member in said housing adjustably interconnected with the screw member adapted to be rotated to rotate said screw member to move the slide bar longitudinally of said tubular bearing with said adjustable interconnection permitting said tubular bearing to be swung about its pivotal connection internally of the housing, and lens cell supporting means slidably mounted in said respective guide means with means for adjusting said lens cell supporting means longitudinally of their respective guideways.

10. In a device of the character described a housing having guideways extending outwardly of the opposed sides thereof, a tubular bearing pivoted internally of said housing, a slide bar in said tubular bearing having a portion with a threaded opening therein and a nose bearing member supported adjacent one end thereof, a screw member rotatably mounted internally of said tubular bearing and threadedly connected with the portion of the slide bar having the threaded opening therein, a coupling member in said housing adjustably interconnected with the screw member adapted to be rotated to rotate said screw member to move the slide bar longitudinally of said tubular bearing with said adjustable interconnection permitting said tubular bearing to be swung about its pivotal connection internally of the housing and lens cell supporting means slidably mounted in said respective guide means, said lens cell supporting means having temples pivotally supported thereby and means for resiliently urging said supported temples toward each other about said pivotal connections.

11. In a device of the character described a housing having guideways extending outwardly of the opposed sides thereof, a tubular bearing pivoted internally of said housing, a slide bar in said tubular bearing having a portion with a threaded opening therein and a nose bearing member supported adjacent one end thereof, a screw member rotatably mounted internally of said tubular bearing and threadedly connected with the portion of the slide bar having the threaded opening therein, a coupling member in said housing adjustably interconnected with the screw member adapted to be rotated to rotate said screw member to move the slide bar longitudinally of said tubular bearing with said adjustable interconnection permitting said tubular bearing to be swung about its pivotal connection internally of the housing and lens cell supporting means slidably mounted in said respective guide means, said lens cell supporting means having temples pivotally supported thereby and means for resiliently urging said supported temples toward each other about said pivotal connections, said temples comprising portions adjustable relative to each other to shorten or lengthen said temples and comprising means for altering the angle of said temples relative to the plane of the lens cell supporting means.

12. In a device of the character described a nose piece assembly comprising a housing having a coupling member rotatably mounted therein, means for rotating said coupling member, a bearing member pivoted internally of said housing to be tilted to different angular positions relative to said coupling member, a slide bar mounted in said bearing member, means for adjusting said slide bar longitudinally of said bearing member and means interconnecting said means for adjusting said slide bar longitudinally of said bearing member with said coupling member whereby rotation of said coupling member will operate said means for adjusting said slide bar member longitudinally of said tubular member and yet permit said tubular member to be tilted about its pivotal connection with the housing and nose bearing means carried by said bar-like member.

13. In a device of the character described a nose piece assembly comprising a housing having a coupling member rotatably mounted therein, means for rotating said coupling member, a bearing member pivoted internally of said housing to be tilted to different angular positions relative to said coupling member, a slide bar mounted in said bearing member, means for adjusting said slide bar longitudinally of said bearing member and means interconnecting said means for adjusting said slide bar longitudinally of said bearing member with said coupling member whereby rotation of said coupling member will operate said means for adjusting said slide bar member longitudinally of said tubular member and yet permit said tubular member to be tilted about its pivotal connection with the housing and nose bearing means carried by said slide bar member, said housing having guideways on the opposed sides thereof, lens cell supporting means slidably mounted in said guideways, said lens cell supporting means having temples pivotally associated therewith and having rearwardly extending supporting members provided with a guide mark thereon and sighting members pivotally connected with said supporting member, resilient means adapted to hold the said sighting members in adjusted position relative to said supporting member and a guide mark on each of said sighting members adapted to be aligned with the guide marks on the said supporting members to form a two-point gun-sight type sighting arrangement when said sighting members are in operative position.

14. In a device of the character described a nose piece assembly comprising a housing having a coupling member rotatably mounted therein, means for rotating said coupling member, a bearing member pivoted internally of said housing to be tilted to different angular positions relative to said coupling member, a slide bar mounted in said bearing member, means for adjusting said slide bar longitudinally of said bearing member and means interconnecting said means for adjusting said slide bar longitudinally of said bearing member with said coupling member whereby rotation of said coupling member will operate said means for adjusting said slide bar member longitudinally of said tubular member and yet permit said tubular member to be tilted about its pivotal connection with the housing and nose bearing means carried by said slide bar member, said housing having guideways on the opposed sides thereof, lens cell supporting means slidably mounted in said guideways, said lens cell supporting means having temples pivotally associated therewith and having rearwardly extending supporting members provided with a guide mark thereon and sighting members pivotally connected with said supporting member, resilient means adapted to hold the said sighting members in adjusted position relative to said supporting member and a guide mark on each of said sighting members adapted to be aligned with the guide marks on the said supporting members to form a two-point gun sight type sighting arrangement when said sighting members are in operative position and means for adjusting said lens cell supporting means longitudinally of their respective guideways.

WILLIAM F. PECK.
ALBIN A. GRADISAR.